(12) United States Patent
Fu et al.

(10) Patent No.: US 12,275,335 B2
(45) Date of Patent: Apr. 15, 2025

(54) PASSENGER COMPARTMENT LAYOUT FOR VEHICLE

(71) Applicants: Hyundai Motor Company, Seoul (KR); Kia Corporation, Seoul (KR)

(72) Inventors: Ernestine Fu, Somerville, MA (US); Hyun Song, Gyeonggi-do (KR); John Suh, Palo Alto, CA (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 323 days.

(21) Appl. No.: 17/870,100

(22) Filed: Jul. 21, 2022

(65) Prior Publication Data
US 2024/0025304 A1    Jan. 25, 2024

(51) Int. Cl.
*B60N 2/01* (2006.01)
*B60N 2/14* (2006.01)
*B62D 57/028* (2006.01)

(52) U.S. Cl.
CPC .............. *B60N 2/01* (2013.01); *B60N 2/14* (2013.01); *B62D 57/028* (2013.01)

(58) Field of Classification Search
CPC .......... B60N 2/01; B60N 2/14; B60N 57/028; B60N 2/005; B62D 31/00; B62D 47/003; B62D 57/022
See application file for complete search history.

(56) References Cited

U.S. PATENT DOCUMENTS

| | | | |
|---|---|---|---|
| 4,309,055 A * | 1/1982 | Law | B60N 2/24 296/14 |
| 9,126,689 B2 | 9/2015 | Porter | |
| 9,174,686 B1 * | 11/2015 | Messina | B62D 23/005 |
| 11,142,096 B2 * | 10/2021 | Onoyama | B60N 2/3047 |
| 11,234,511 B2 * | 2/2022 | Onoyama | B60N 3/001 |
| 2003/0141736 A1 * | 7/2003 | Chernoff | B60N 2/01 296/65.01 |
| 2013/0193729 A1 * | 8/2013 | VanMiddendorp | B60N 2/14 297/311 |
| 2018/0099705 A1 * | 4/2018 | Faruque | B62D 47/02 |
| 2019/0016287 A1 * | 1/2019 | Amidon | B60N 2/242 |
| 2019/0126787 A1 * | 5/2019 | Line | B60N 2/0742 |
| 2019/0146494 A1 * | 5/2019 | Li | B60N 2/01 701/23 |
| 2020/0039385 A1 * | 2/2020 | Takamura | B60N 2/90 |
| 2020/0039386 A1 * | 2/2020 | Takamura | B60N 3/063 |
| 2020/0039388 A1 * | 2/2020 | Onoyama | B60N 2/3097 |
| 2020/0216127 A1 * | 7/2020 | Suh | B62D 57/028 |
| 2021/0276642 A1 * | 9/2021 | Gillett | G05D 1/0022 |
| 2023/0211841 A1 * | 7/2023 | Fu | B60B 19/00 180/8.1 |
| 2023/0211842 A1 * | 7/2023 | Fu | G06V 20/56 |

FOREIGN PATENT DOCUMENTS

| | | | | |
|---|---|---|---|---|
| CN | 105216902 A * | 1/2016 | | |
| CN | 113968174 A * | 1/2022 | | |
| DE | 202004015422 U1 * | 1/2005 | | B64F 5/0036 |

(Continued)

*Primary Examiner* — Lori Lyjak
(74) *Attorney, Agent, or Firm* — Fox Rothschild LLP

(57) ABSTRACT

A walking vehicle including a chassis including a passenger compartment is described. The passenger compartment includes a pilot position and a plurality of passenger positions for positioning passengers in a plurality of outward facing directions.

20 Claims, 11 Drawing Sheets

(56) References Cited

FOREIGN PATENT DOCUMENTS

| | | | | |
|---|---|---|---|---|
| DE | 102016104568 A1 | * | 9/2017 | ............. B60N 2/005 |
| DE | 102019117438 A1 | * | 1/2020 | ............. B60N 2/005 |
| EP | 0065494 A1 | * | 11/1982 | |
| GB | 2548917 A | * | 10/2017 | ............. B25J 5/007 |
| JP | 05058330 A | * | 3/1993 | |
| JP | 2001124054 A | * | 5/2001 | |
| WO | WO-2019030026 A1 | * | 2/2019 | ............. B62D 65/18 |

* cited by examiner

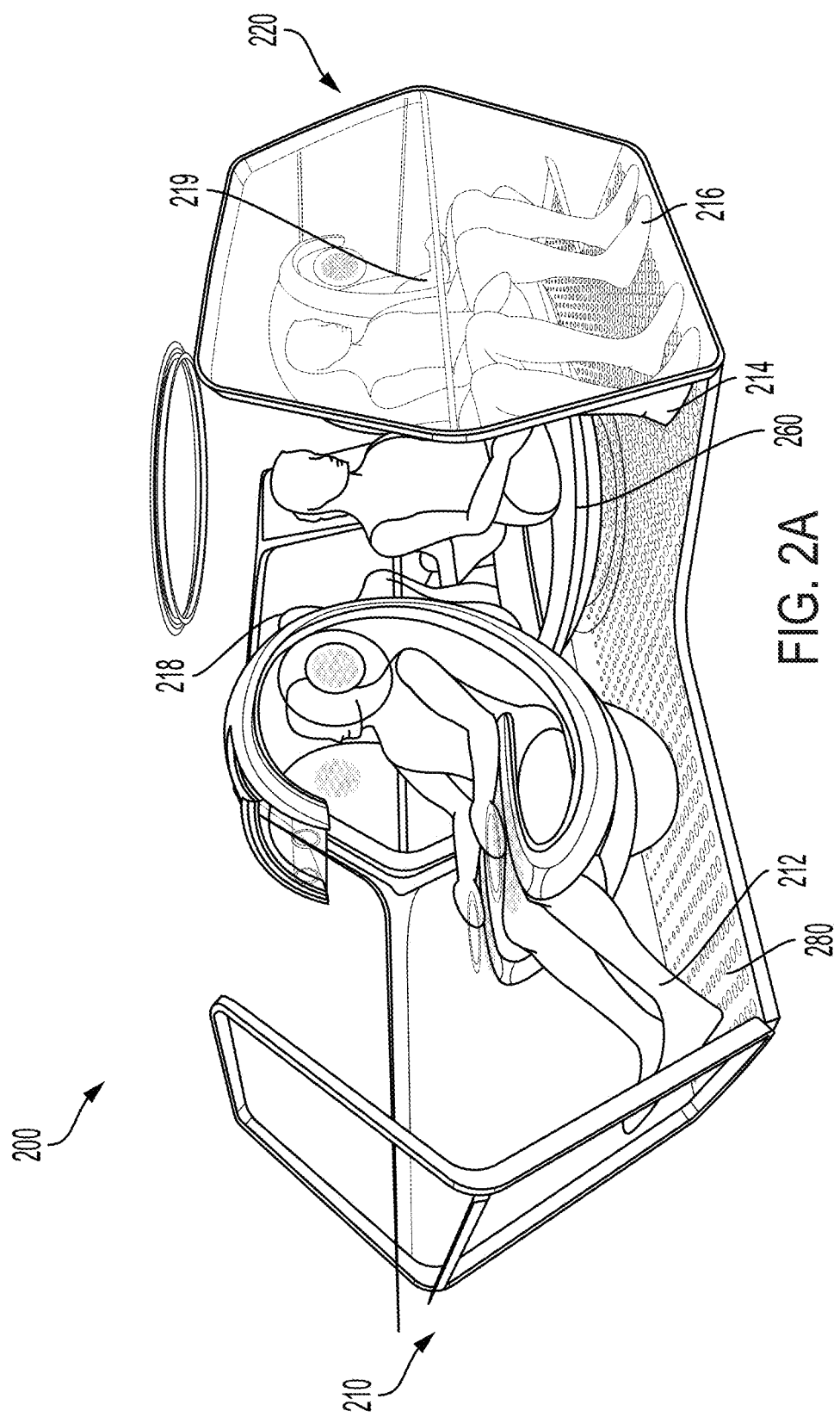

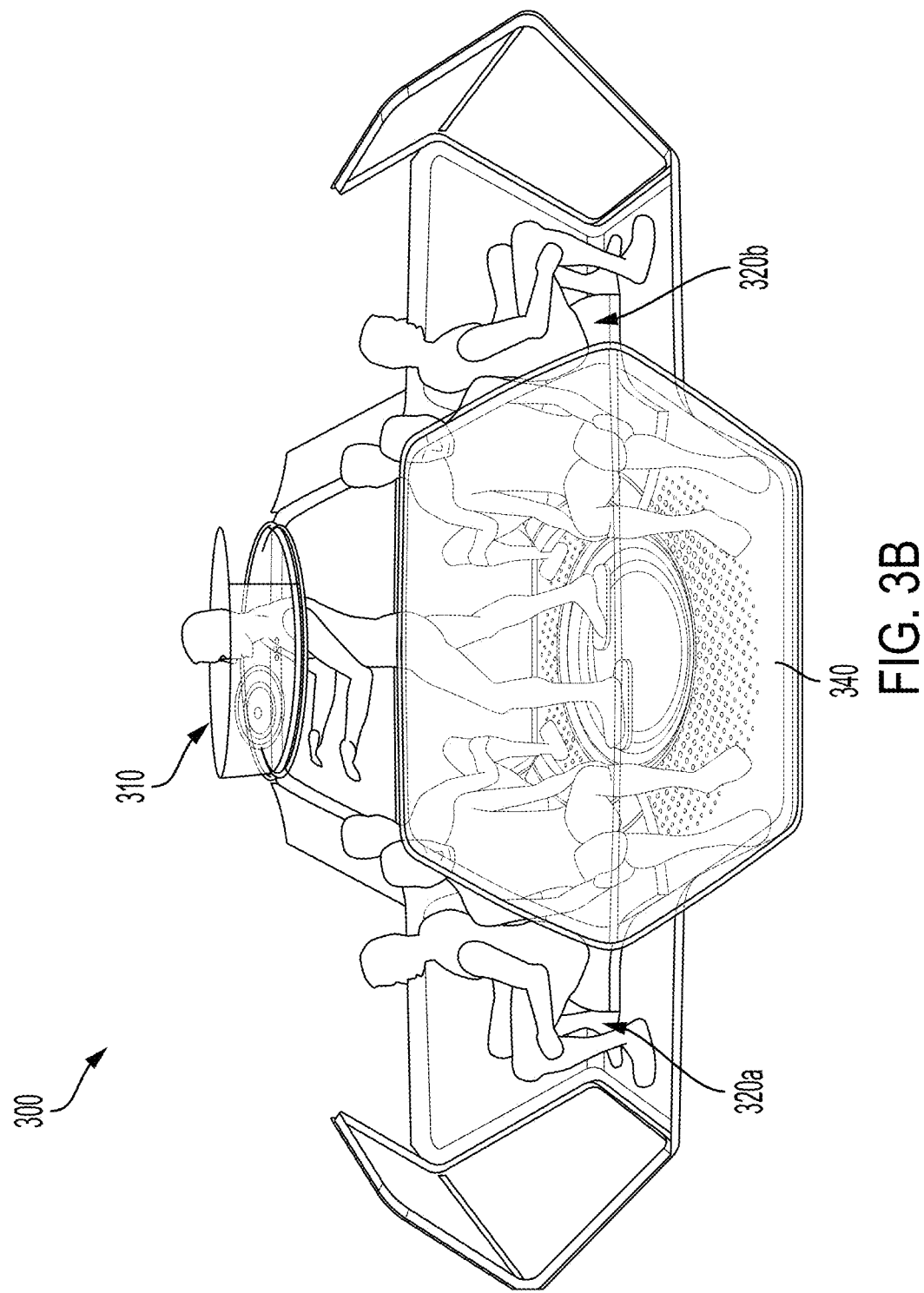

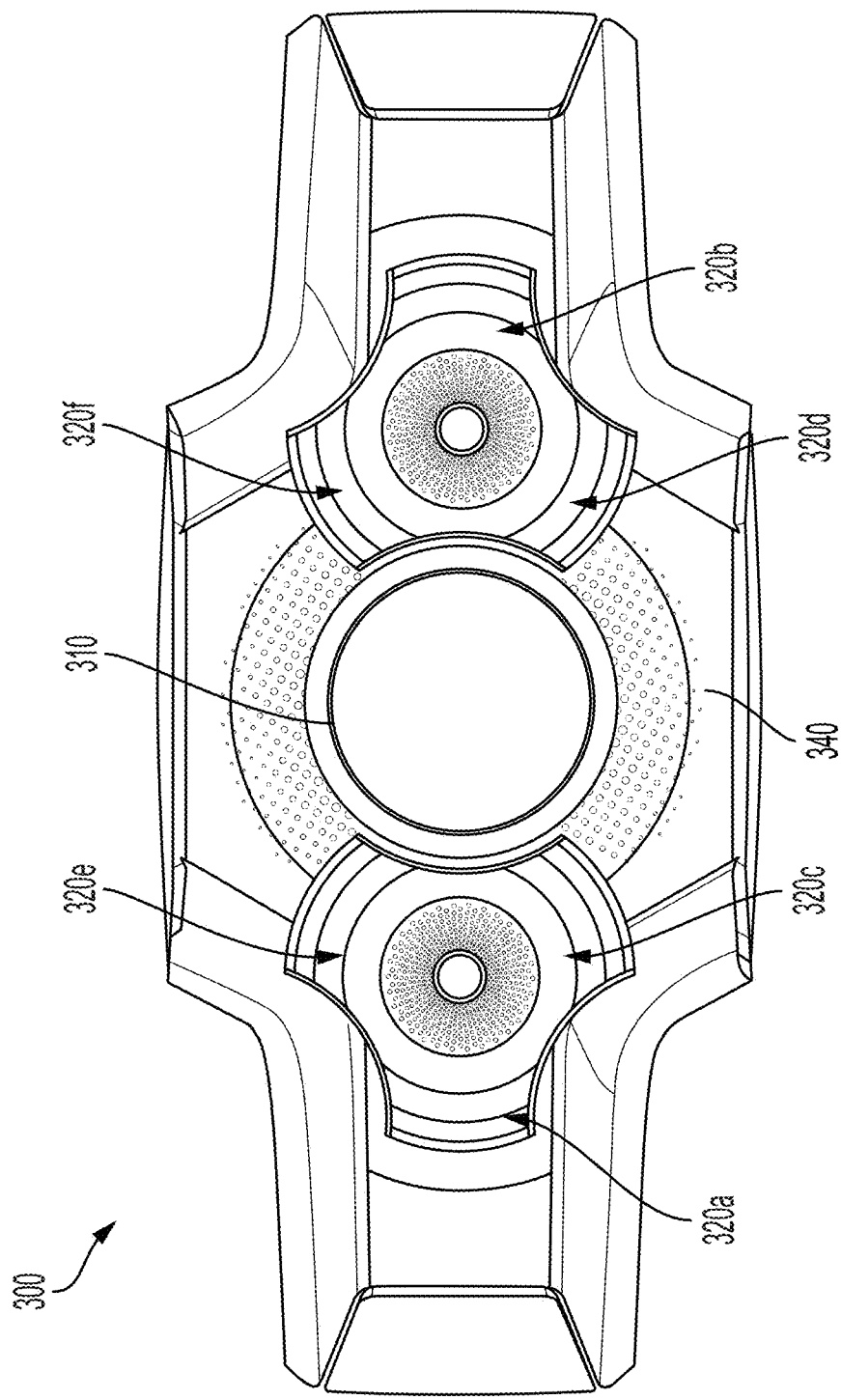

PASSENGER COMPARTMENT LAYOUT FOR VEHICLE

BACKGROUND

Conventional passenger motor vehicles are designed to primarily move in a forward direction, with the passenger seats positioned in the passenger compartment facing in the direction of motion. New motor vehicles capable of wheeled and walking motion, such as the Hyundai Elevate, will be capable of omnidirectional movement (e.g., in the walking mode). Current seating arrangements are not designed for omnidirectional vehicles.

SUMMARY

We now provide passenger compartments and layouts thereof for a vehicle, including vehicles capable of locomotion using both walking motion and rolling traction.

In some embodiments, passenger seating is arranged within the passenger compartment such that one or more or all passengers are facing outwards (e.g., facing the windshield or window that they are closest to). In some embodiments, a pilot or multiple pilots are positioned at one end or opposing ends of the vehicle. In some embodiments, a pilot is positioned in the middle of the vehicle. This pilot position may rotate such that the pilot can face the direction of travel of the vehicle.

In one aspect, a vehicle is provided that comprises a passenger compartment comprising a plurality of passenger positions for positioning passengers in a plurality of outward facing directions. In a preferred aspect, the vehicle is configured for omnidirectional travel, for example, the vehicle comprises a plurality of wheel-leg components, wherein the plurality of wheel-leg components can provide wheeled locomotion and walking locomotion.

In one aspect, a vehicle s provided that comprises a pilot position and one or more passenger positions, and the pilot position faces an outward direction different than the outward direction that one or more passenger positions face.

In a further aspect, a vehicle is provided, including a vehicle capable of omnidirectional travel, the vehicle comprising: a passenger compartment, the passenger compartment comprising: 1) a pilot position; and 2) one or more passenger positions for positioning passengers in one or more outward facing directions. One or more passengers can be facing different directions with respect to the pilot position as well as with respect to one or more other passengers. A first passenger suitably may be positioned facing the same direction as at least one other passenger which other passenger may be seated or positioned adjacent to the first passenger.

One or more occupants (e.g. a pilot or driver and/or passenger who is not operating vehicle) may be positioned (e.g. in a seat) in vehicle to be outwardly facing in a variety of respective positions. For instance, a vehicle occupant who is facing a different direction than another occupant (e.g. an adjacent vehicle occupant) may be for example at a position that is up to 30, 45, 60, 90, 120, 150 or 180 degrees with respect to the position of the other (e.g. adjacent) occupant.

A vehicle suitably may have a variety of number of passenger/pilot seats that are each outward facing in a different direction, for example 2, 3, 4, 5, 6, 7, 8 or more seats that are each outward facing in a different (e.g. at least 10, 20, 30 or 45 degrees different) direction.

In one aspect, a vehicle is provided, including a vehicle capable of omnidirectional travel, the vehicle comprising: a chassis comprising a passenger compartment, the passenger compartment comprising: 1) a pilot position; and 2) a plurality of passenger positions for positioning passengers in a plurality of outward facing directions. One or more passengers can be facing different directions with respect to the pilot position as well as with respect to one or more other passengers. A first passenger suitably may be positioned facing the same direction as at least one other passenger which other passenger may be seated or positioned adjacent to the first passenger.

In a further aspect, a vehicle is provided, including a vehicle capable of omnidirectional travel, the vehicle comprising: a passenger compartment, the passenger compartment comprising: 1) a pilot position; and 2) a plurality of passenger positions for positioning passengers in a plurality of outward facing directions. In one aspect, a vehicle is provided, including a vehicle capable of omnidirectional travel, the vehicle comprising: a chassis comprising a passenger compartment, the passenger compartment comprising: 1) a pilot position; and 2) a plurality of passenger positions for positioning passengers in a plurality of outward facing directions.

In certain embodiments, the vehicle comprises a plurality of wheel-leg components coupled to the chassis, wherein the plurality of wheel-leg components can provide (e.g. collectively) wheeled locomotion and/or walking locomotion.

In certain embodiments, the vehicle further comprises a plurality of leg components suitably coupled to the chassis, wherein the plurality of leg components can provide (e.g. collectively) wheeled locomotion and/or walking locomotion.

In certain embodiments, the pilot position is in a central location of the passenger compartment. In certain embodiments, the pilot position is rotatable. In certain embodiments, one or more of the passenger positions are rotatable. In certain embodiments, one or more passenger positions comprises a removable passenger seat.

In another aspect, a vehicle cabin is provided and suitably configured to support omnidirectional travel of a vehicle, the vehicle cabin comprising: 1) a pilot section that suitably comprises a pilot support feature (e.g. seat) for securing a pilot of the vehicle; and 3) a passenger section suitably comprising a passenger support feature (e.g. seat) for securing a passenger to the vehicle, wherein the pilot support feature is configured to face a different direction than the passenger support feature.

In an aspect, a vehicle cabin is provided and suitably configured to support omnidirectional travel of a vehicle, the vehicle cabin comprising: 1) a cabin floor configured to attach to a vehicle chassis, the cabin floor configured to support a passenger in the vehicle; 2) a pilot section at a first area on the cabin floor, the pilot section including a pilot support feature (e.g. seat) for securing a pilot of the vehicle; and 3) a passenger section at a second area on the cabin floor, the passenger section including a passenger support feature (e.g. seat) for securing a passenger to the vehicle, wherein the pilot support feature is configured to face a different direction than the passenger support feature.

In certain embodiments, the passenger support feature includes a first seating area and a second seating area, the first seating area facing a different direction than the second seating area.

In certain embodiments, the pilot support feature is configured to rotate with respect to a direction in which the vehicle travels. In certain embodiments, the pilot support feature includes a seat with a steering interface. In certain embodiments, the pilot section is located in a center portion of the cabin floor.

In certain embodiments, the cabin floor includes a front portion, a back portion and the center portion, wherein the pilot section is located in the center portion, and wherein the passenger section is located in at least one of the front portion and the back portion.

In certain embodiments, the passenger support feature is configured to rotate with respect to a direction in which the vehicle travels. In certain embodiments, the passenger support feature is situated in front of a vehicle window. In certain embodiments, the pilot support feature and the passenger support feature are oriented in a direction facing outside the vehicle cabin. In certain embodiments, the pilot support feature and the passenger support feature are configured to be removed from the vehicle.

In certain embodiments, the vehicle further comprises a plurality of wheel-leg components coupled to the vehicle, wherein the plurality of wheel-leg components are collectively operable to provide wheeled locomotion and walking locomotion.

In a yet further aspect, a vehicle cabin system configured to support omnidirectional travel of a vehicle, the vehicle cabin system comprising: 1) a cabin floor configured to attach to a vehicle chassis, the cabin floor configured to support a passenger in the vehicle; 2) a pilot section at a first area on the cabin floor, the pilot section including a pilot support feature for securing a pilot of the vehicle; and 3) a passenger section at a second area on the cabin floor, the passenger section including a passenger support feature for securing a passenger to the vehicle, wherein the pilot support feature is configured to face a different direction than the passenger support feature.

In certain embodiments of this aspect the passenger support feature includes a first seating area and a second seating area, the first seating area facing a different direction than the second seating area; and/or the pilot support feature is configured to rotate with respect to a direction in which the vehicle travels; and/or the pilot support feature includes a seat with a steering interface; and/or the pilot section is located in a center of the cabin floor; and/or the cabin floor includes a front portion, a back portion and a center portion, wherein the pilot section is located in the center portion, and wherein the passenger section is located in at least one of the front portion and the back portion; and/or the passenger support feature is configured to rotate with respect to a direction in which the vehicle travels.

In further aspects, vehicles are also provided that comprise a vehicle cabin as disclosed herein.

Conventional passenger motor vehicles are designed to primarily move in a forward direction, with the passenger seats positioned in the passenger compartment facing in the direction of motion. New motor vehicles capable of wheeled and walking motion, are capable of omnidirectional movement (e.g., in the walking mode). Current seating arrangements are not designed for omnidirectional vehicles.

Embodiments described herein reimagine the passenger compartment of motor vehicles in consideration of vehicles that are capable of omnidirectional travel. Having passengers of a vehicle capable of omnidirectional movement seated in varying positions allows for improved visibility of the passengers (e.g., in a search and rescue mission). Having the driver in a rotating seat/position allows for omnidirectional steering without requiring the driver to contort their body in an unnatural position as the direction the vehicle travels changes.

In some embodiments, a passenger compartment of a vehicle capable of omnidirectional travel with passengers seated facing multiple directions is described. Such an embodiment allows for positioning passengers in different directions, providing easy external visibility in all directions.

In some embodiments, a passenger compartment of a vehicle capable of omnidirectional travel with a driver in a rotating position that can move in the direction of travel (or any other direction) while in operation is described. The pilot can be in the middle of the passenger compartment, with a seat position that can be rotated in any direction, allowing for visibility in any direction of travel.

In some embodiments, the passenger seats of the seating positions can rotate, allowing improved directional visibility for passengers. In some embodiments, the passenger seats are removable from the passenger compartment, and possibly capable of self-propelled motion.

In some embodiments, a combination of wheels and legs are used to enable at least six degrees of freedom and omnidirectional movement, including mammalian and reptilian walking gaits. In some embodiments, the wheel-leg locomotion is provided using multiple wheel-leg units (e.g., four wheel-leg units) that are collectively operated to provide locomotion to the desired locomotion.

This movement capability of rolling motion and walking motion, referred to herein as wheel-leg locomotion, may be used in manned or autonomous vehicles. Such articulation in movement enables exploration of extreme off-road terrains using walking gaits, as well as travel across roads using efficient rolling modes. For example, the vehicle can scale rough rocks that would otherwise be untraversable using a vehicle, requiring a person to exit the vehicle and proceed on foot. Simultaneously, it is also a practical vehicle that can traverse both paved and unpaved roads using driven wheel locomotion. This dual-domain is enabled by using wheel-leg locomotion.

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The term pilot, such as a pilot of a vehicle, as stated herein includes the operator (e.g. driver of a vehicle.

Also, in certain embodiments, the present systems and vehicles may be autonomous, fully autonomous. In certain embodiments, the present systems and vehicles may be autonomous. In other certain embodiments, the present systems and vehicles may be semi-autonomous. In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

Preferred vehicles also are ground vehicles and do not have air mobility (flying) movement.

Other aspects of the invention are disclosed infra.

BRIEF DESCRIPTION OF THE DRAWINGS

FIG. 2A is a perspective view illustrating an example first passenger compartment layout of a vehicle capable of omnidirectional movement, according to embodiments.

FIG. 3B is a side view illustrating an example second passenger compartment layout of a vehicle capable of omnidirectional movement showing the pilot and passengers, according to embodiments.

FIG. 3C is a top view illustrating an example second passenger compartment layout of a vehicle capable of omnidirectional movement without a pilot or passengers, according to embodiments.

DETAILED DESCRIPTION

Figure 1A:
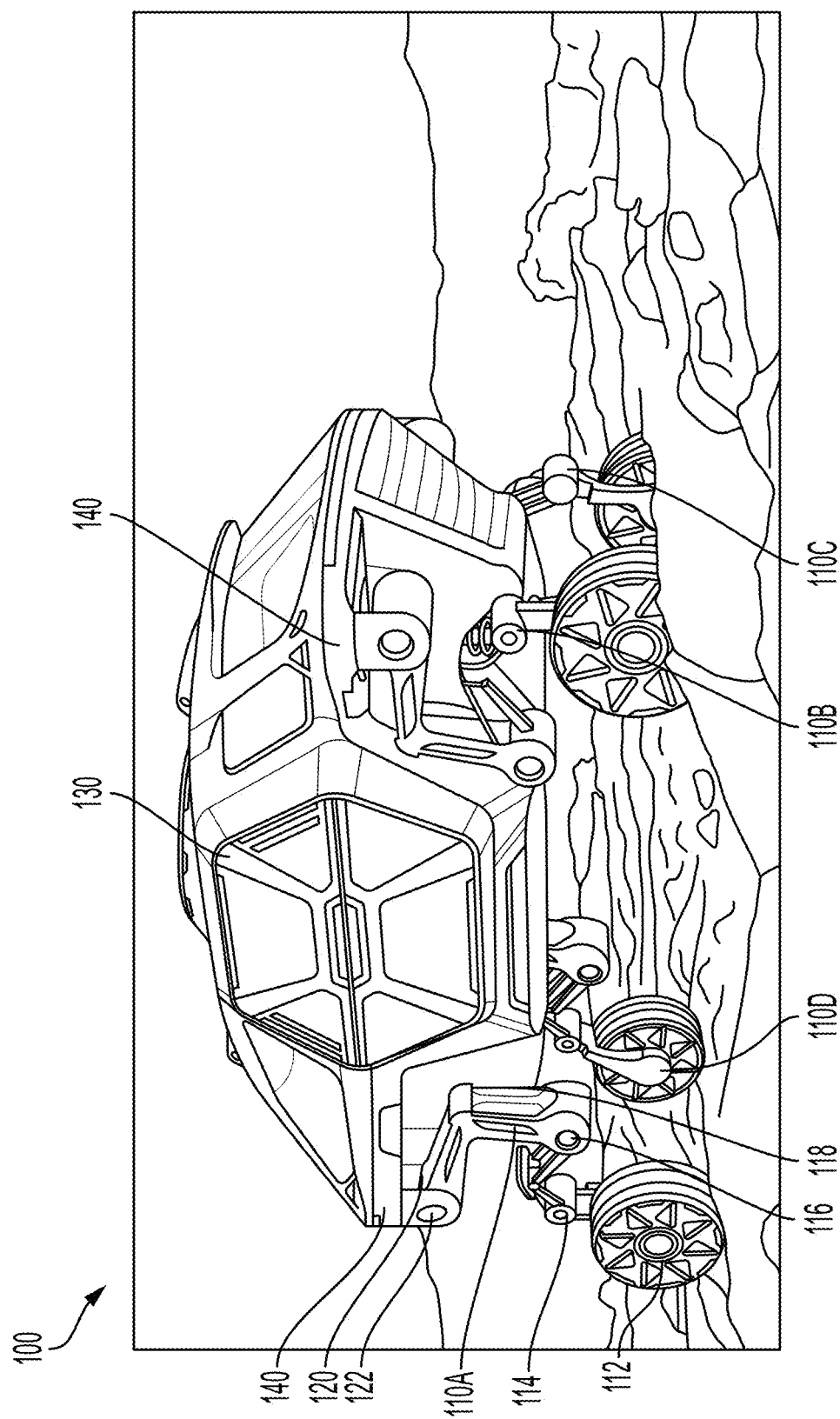
FIGS. 1A through 1C are drawings of a vehicle capable of omnidirectional movement using both walking motion and rolling motion, according to embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, and components have not been described in detail as not to unnecessarily obscure aspects of the described embodiments.

In one aspect, a vehicle capable of both wheeled locomotion and walking locomotion, in accordance with various embodiments is disclosed. Example passenger compartment layouts where passenger seating is arranged within the passenger compartment such that one or more or all passengers are facing outwards are disclosed, including in accordance with various embodiments. Example passenger compartment layouts where a pilot is positioned in the middle of the vehicle are disclosed, including in accordance with various embodiments. Examples of removable passenger compartment seating are disclosed, in accordance with various embodiments.

Embodiments described herein are implemented using a walking vehicle including a chassis and a plurality of wheel-leg components. The plurality of wheel-leg components are collectively operable to provide wheeled locomotion and walking locomotion. In some embodiments, the wheel-leg components have multiple degrees of freedom. In some embodiments, the wheel-leg components provide the wheeled locomotion in a retracted position and provide the walking locomotion in an extended position. In one embodiment, the plurality of wheel-leg components utilize a mammalian walking gait during the walking locomotion. In one embodiment, the plurality of wheel-leg components utilize a reptilian walking gait during the walking locomotion. A preferred rolling-walking and wheel-leg components are disclosed in U.S. Patent Application Publication No. 2020/0216127.

Embodiments of the described vehicle are serviceable in different use cases, such as and without limitation; urban mobility, senior mobility, the daily drive, defense and search and rescue, and patrol, survey, or expedition. The described vehicle is of a size to hold and transport passengers, and may be controlled by a pilot, remotely, or autonomously.

Embodiments described herein utilize wheel-leg components have a number of degrees of freedom, e.g., six degrees of freedom. The wheel-leg components are operable using wheeled locomotion in a retracted state and operable in walking locomotion when in an extended state. While the vehicle is described herein as having four wheel-leg components, it should be appreciated that there can be different amounts of wheel-leg components depending on the use case.

Figure 1B:
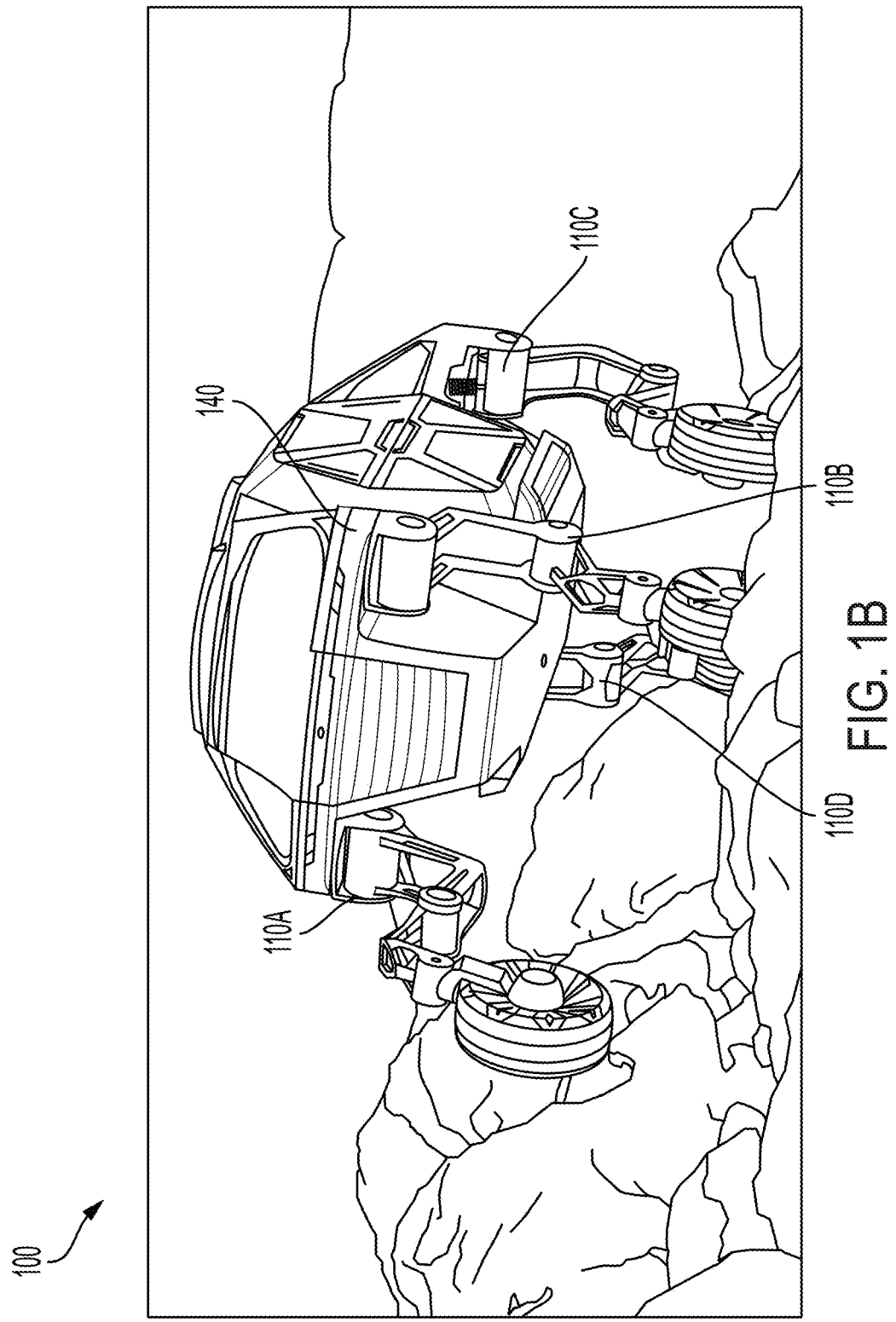
Figure 1C:
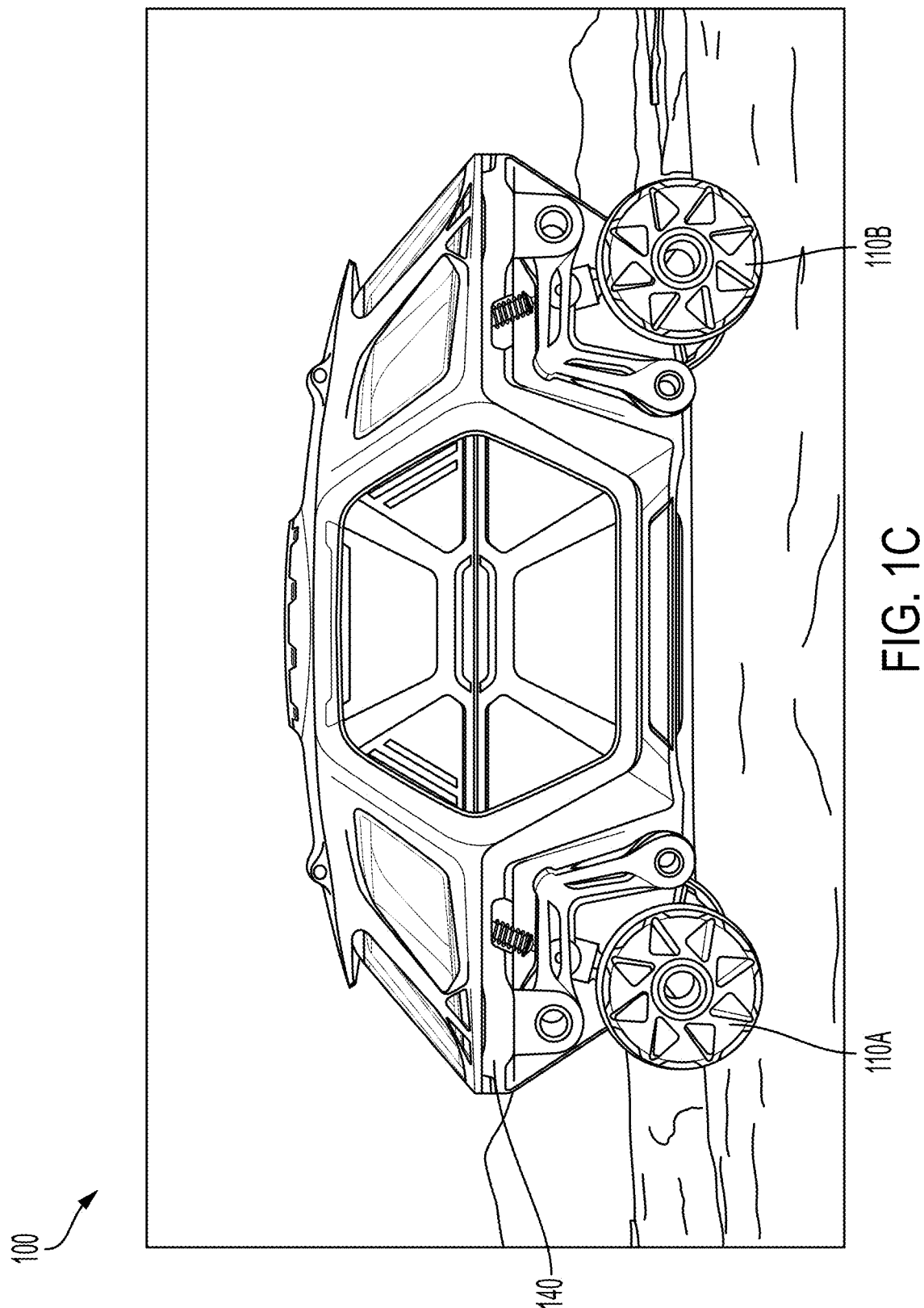

FIGS. 1A through 1C are drawings of a vehicle 100 capable of omnidirectional movement using both walking motion and rolling motion, according to embodiments. FIGS. 1A and 1B illustrate vehicle 100 in different walking locomotion across rugged terrain, where vehicle 100 is capable of omnidirectional movement. FIG. 1C illustrates a side view of vehicle 100. Vehicle 100 includes four wheel-leg components including at least two degrees of freedom. As illustrated, vehicle 100 includes a passenger compartment capable of holding people. It should be appreciated that vehicle 100, in some embodiments, may be operated by a pilot, may be operated remotely, or may be operated autonomously.

FIG. 1A is a diagram illustrating an example vehicle 100 capable of locomotion using both walking motion and rolling motion, according to embodiments. Vehicle 100 includes four wheel-leg components 110 (110A, 110B, 110C, 110D), where wheel-leg components 110 include at least two degrees of freedom. As shown in FIGS. 1A, 1B and 1C, the depicted wheel-leg components 110 include wheel 112 and lower leg portion 114 that mates with knee portion 116 and upper leg portions 118 and 120 that mate with hip portion 122 and knee portion 116. As shown, vehicle 100 includes a passenger compartment 130 capable of holding people. The wheel-leg components suitably mate with a chassis element 140 of vehicle 100 as generally shown in the exemplary systems of FIGS. 1A, 1B and 1C.

Multiple (such as four per vehicle) wheel-leg components are preferably used with a vehicle.

In one embodiment, wheel-leg components 110 include six degrees of freedom. It should be appreciated that while wheel-leg components 110 are controlled collectively to provide rolling and walking locomotion, each wheel-leg component 110 is capable of different movement or positioning during operation. For example, while using wheeled locomotion on an upward slope, in order to maintain the body of vehicle 100 level with flat ground, the front wheel-leg components 110 may be retracted and the rear wheel-leg components 110 be extended. In another example, while using walking locomotion to traverse rough terrain, each wheel-leg component 110, or opposite pairs of wheel-leg components 110 (e.g., front left and rear right), can move differently than the other wheel-leg components 110.

In some embodiments, vehicle 100 includes four wheel-leg components 110 that are each capable of up to six degrees of freedom, for a total of twenty-four degrees of freedom for the vehicle. For instance, the wheel-leg components are capable of actively driven wheel locomotion (one degree of freedom) and five degrees of freedom within joints of the leg. The wheel-leg components 110 are configured to operative cooperatively to provide different walking gaits that are appropriate to a given terrain.

Embodiments of the described vehicle are serviceable in different use cases, such as use in extreme environments. As illustrated, vehicle 100 is shown in a mountainous region with uneven and rocky terrain, requiring the usage of walking locomotion. The described vehicle may be of a size to hold and transport passengers, or may be a smaller unmanned vehicle meant for exploration or cargo transport. Depending on the use case, there are mobility capabilities that cover most types of terrain traversal while in walking locomotion mode. The mobility capabilities include, without limitation, 1) step-up, 2) ramp or incline climb, 3) obstacle step-over, and 4) gap crossing.

In some embodiments, vehicle 100 can operate in different walking locomotion modes, such as a mammalian walking gait or a reptilian walking gate. As with the mammalian and reptilian walking gaits found naturally in mammals and reptiles, different walking gaits are amenable to different terrains and environments. For instance, a reptilian gait has a wide stance, increasing balance, while a mammalian gait generally improves traversal in the forward direction by providing increased speed. Other walking gaits, or combinations of features from different walking gaits found in nature, can be combined to provide desired mobility and locomotion. For example, vehicle 100 may require the ability to fold wheel-leg components 110 so that they would be compact when retracted.

In one embodiment, the wheel-leg components include six degrees of freedom. It should be appreciated that while the wheel-leg components are controlled collectively to provide rolling and walking locomotion, each wheel-leg component is capable of different movement or positioning during operation. For example, while using wheeled locomotion on an upward slope, in order to maintain the body of vehicle 100 level with flat ground, the front wheel-leg components may be retracted and the rear wheel-leg components be extended. In another example, while using walking locomotion to traverse rough terrain, each wheel-leg component, or opposite pairs of the wheel-leg components (e.g., front left and rear right), can move differently than the other wheel-leg components. The wheel-leg components can operate to move vehicle 100 in any direction of travel, and can change directions at any time.

FIG. 2A is a perspective view illustrating an example first passenger compartment layout 200 of a vehicle capable of omnidirectional movement, according to embodiments. Having passengers of a vehicle capable of omnidirectional movement seated in varying positions allows for improved visibility of the passengers. Positioning passengers outward facing allows for visibility in all directions of the vehicle. For example, such enhanced visibility is useful in search and rescue missions, surveillance operations, covert operations, etc.

As illustrated in FIG. 2A, first passenger compartment layout 200 includes six passenger locations, each of which is capable of outward facing positioning. In some embodiments, the passenger locations are rotating or otherwise changeable, allowing passengers to face different directions. First passenger compartment layout 200 can include one or more pilots, e.g., one (pilot 212) at position 210 or one (pilots 212, 219) at each of positions 210 and 220. The compartment layout 200 suitably comprises positions for additional passengers such as 214, 216 and 218 as shown in FIG. 2A, which shows adjacent seated passengers 214 and 216 facing the same direction but an opposite direction from passenger 218 which is positioned on another bench seat 260. Each of passengers 214, 216, 218 face different directions (offset) 90° from pilot passengers 212 and 219.

Figure 2B:
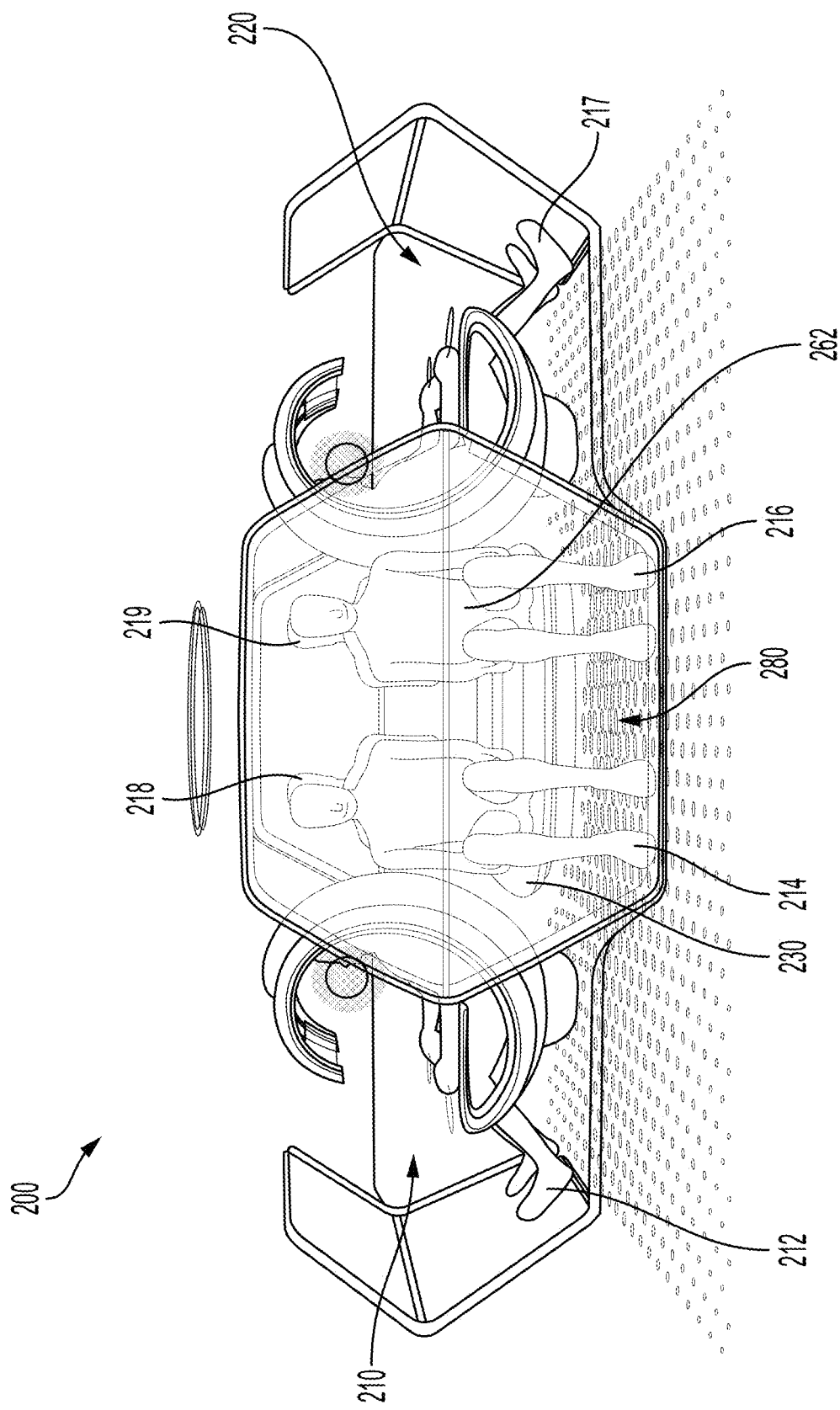
FIG. 2B is a side view illustrating an example first passenger compartment layout of a vehicle capable of omnidirectional movement, according to embodiments.

FIG. 2B is a side view illustrating example first passenger compartment layout 200 of a vehicle capable of omnidirectional movement, according to embodiments. As shown in FIG. 2B, adjacent seated passengers 214 and 216 face the same direction as do adjacent seated passengers 218 and 219. Those passengers 214, 216, 218 and 219 face opposing directions and different directions than pilots or passengers 212 and 217. It should be appreciated that first passenger compartment layout 200 can include any number of passengers and/or pilots. The compartment layout 200 includes cabin floor 280 to which the depicted passenger seats may be joined.

Figure 3A:
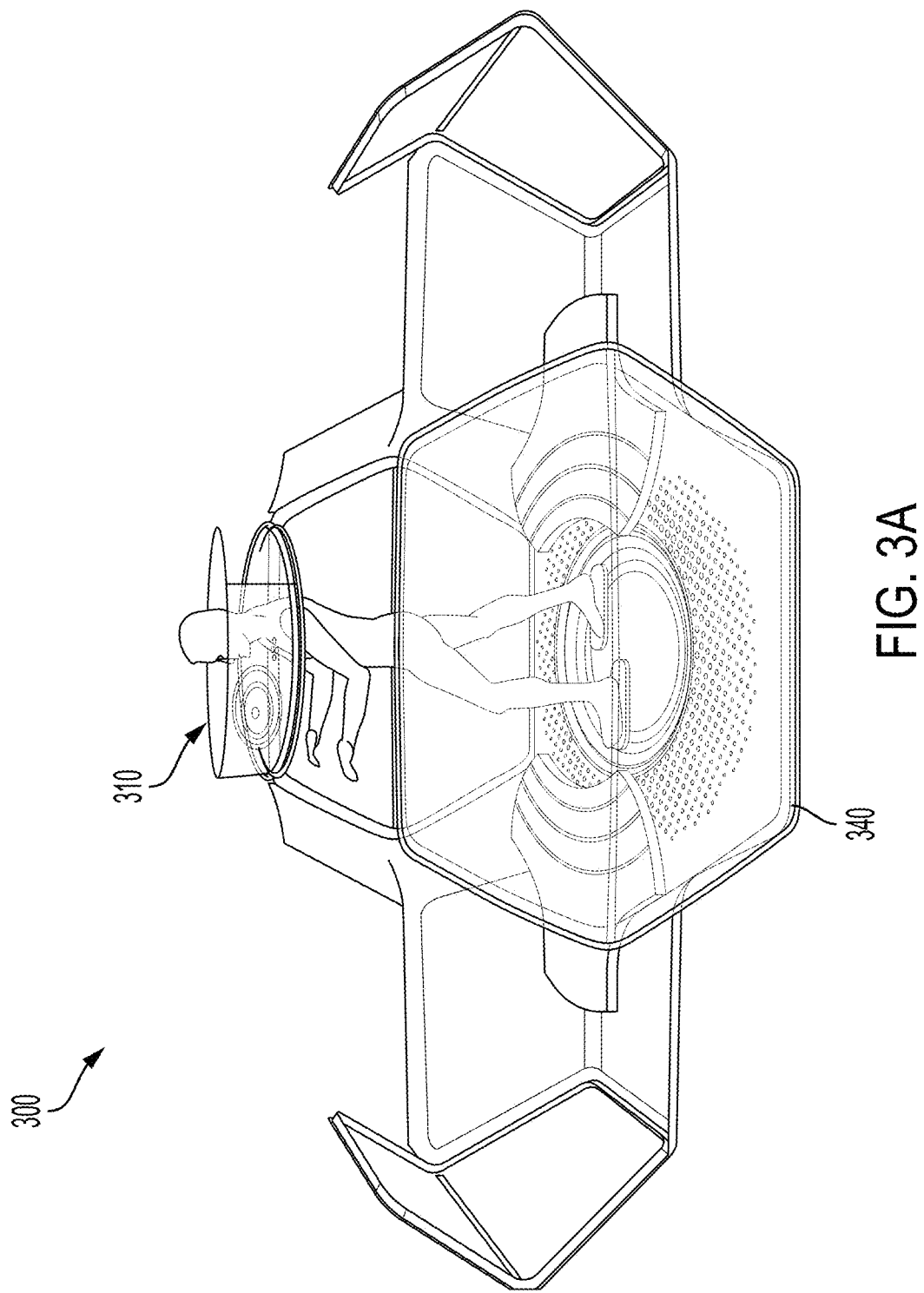
FIG. 3A is a side view illustrating an example second passenger compartment layout of a vehicle capable of omnidirectional movement showing only the pilot, according to embodiments.

As illustrated in FIG. 2B, the passenger seats at positions 210 and 220 are separate seats, and the other seating positions such as 230 are suitably bench seats. It should be appreciated that any type of seating can be used at any position. In some embodiments, the passenger seats at positions 210 and 220 movably rotate, allowing the pilot(s) to move direction as the direction of the vehicle changes FIG. 3A is a side view illustrating an example second passenger compartment layout 300 of a vehicle capable of omnidirectional movement showing only the pilot or single passenger who is in a standing rather than seated position, according to embodiments. Having passengers of a vehicle capable of omnidirectional movement seated in varying positions allows for improved visibility of the passengers. Positioning passengers outward facing allows for visibility in all directions of the vehicle. For example, such enhanced visibility is useful in search and rescue missions, surveillance operations, covert operations, etc. The compartment layout 300 includes cabin floor 340.

As illustrated in FIG. 3B, second passenger compartment layout 300 includes six passenger locations, each of which is capable of outward facing positioning. In some embodiments, the passenger locations are rotating, allowing passengers to face different directions. Second passenger compartment layout 300 can include one pilot at position 310. It should be appreciated that second passenger compartment layout 300 can include any number of passengers and/or pilots. While the pilot at position 310 is illustrated as standing, it should be appreciated that position 310 can include a seat (e.g., an elevated seat), a stool, or an elevated seating or standing position. In general, the person at position 310 is positioned such that their head is positioned above the passenger compartment, e.g., in an open view windshield or a bubble. In some embodiments, position 310 rotates in any direction, allowing for visibility in any direction of travel. Having the driver in a rotating seat/position allows for omnidirectional steering without requiring the driver to contort their body in an unnatural position. The compartment layout 300 includes cabin floor 340 to which the depicted passenger seats may be joined.

FIG. 3B is a side view illustrating example second passenger compartment layout 300 of a vehicle capable of omnidirectional movement showing the pilot and passengers, according to embodiments. As illustrated in FIG. 3B, second passenger compartment layout 300 includes six passenger locations, each of which is capable of outward facing positioning. In some embodiments, the passenger locations are rotating, allowing passengers to face different directions, second passenger compartment layout 300 can include one pilot, e.g., one at position 310. It should be appreciated that second passenger compartment layout 300 can include any number of passengers and/or pilots. Two passengers are illustrated at positions 320a and 320b.

FIG. 3C is a top view illustrating exemplary second passenger compartment layout 300 of a vehicle capable of omnidirectional movement without a pilot or passengers, according to embodiments. As illustrated, second passenger compartment layout 300 includes a central pilot position at position 310, and six passenger positions 320a-320f. The compartment layout 300 includes cabin floor 340 to which passenger seats suitably may be joined.

Figure 3D:
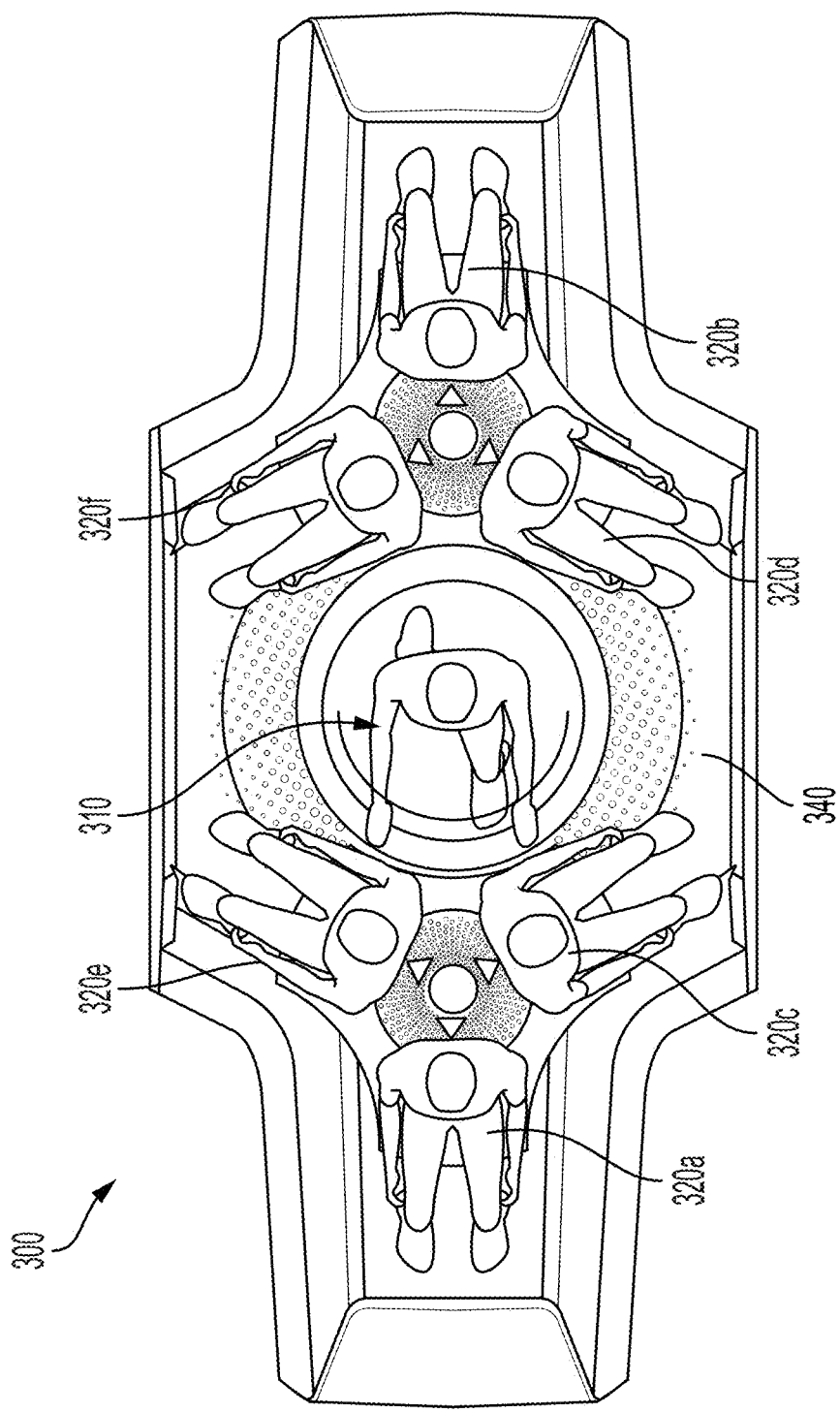
FIG. 3D is a top view illustrating an example second passenger compartment layout of a vehicle capable of omnidirectional movement with a pilot and passengers, according to embodiments.

FIG. 3D is a top view illustrating example second passenger compartment layout 300 of a vehicle capable of omnidirectional movement with a pilot and passengers, according to embodiments. As illustrated, second passenger compartment layout 300 includes a central pilot position at position 310, and six passenger positions 320a-320f. The compartment layout 300 includes cabin floor 340 to which passenger seats suitably may be joined.

Figure 4B:
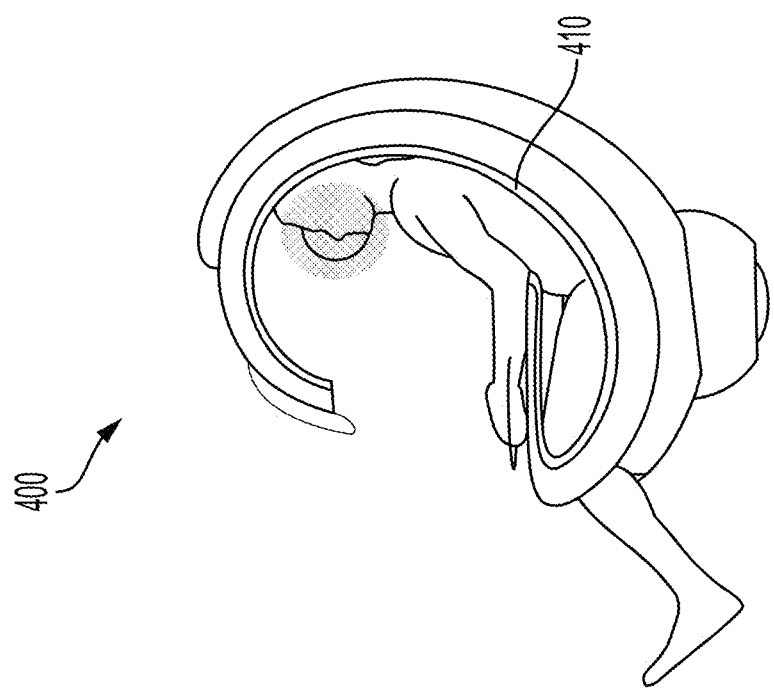
FIGS. 4A and 4B are illustrate perspective and side views of a passenger seat of a vehicle capable of omnidirectional movement, according to embodiments.
Figure 4A:
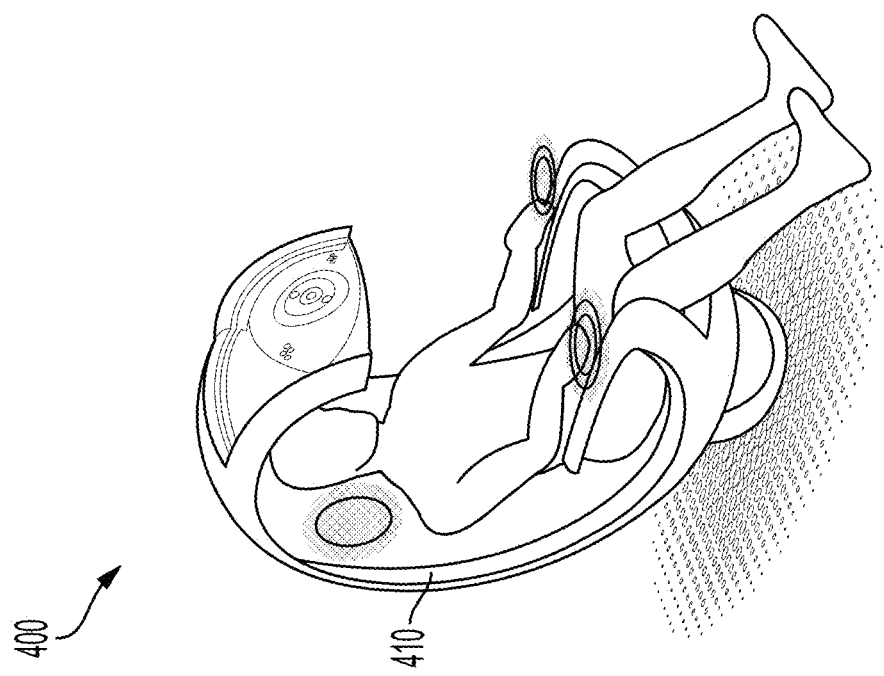

FIGS. 4A and 4B are illustrate perspective and side views of a passenger seat 400 of a vehicle capable of omnidirectional movement, according to embodiments. In some embodiments, the passenger seats 400 (with passenger 410) of the seating positions suitably can rotate, allowing improved directional visibility for passengers.

Figure 4C:
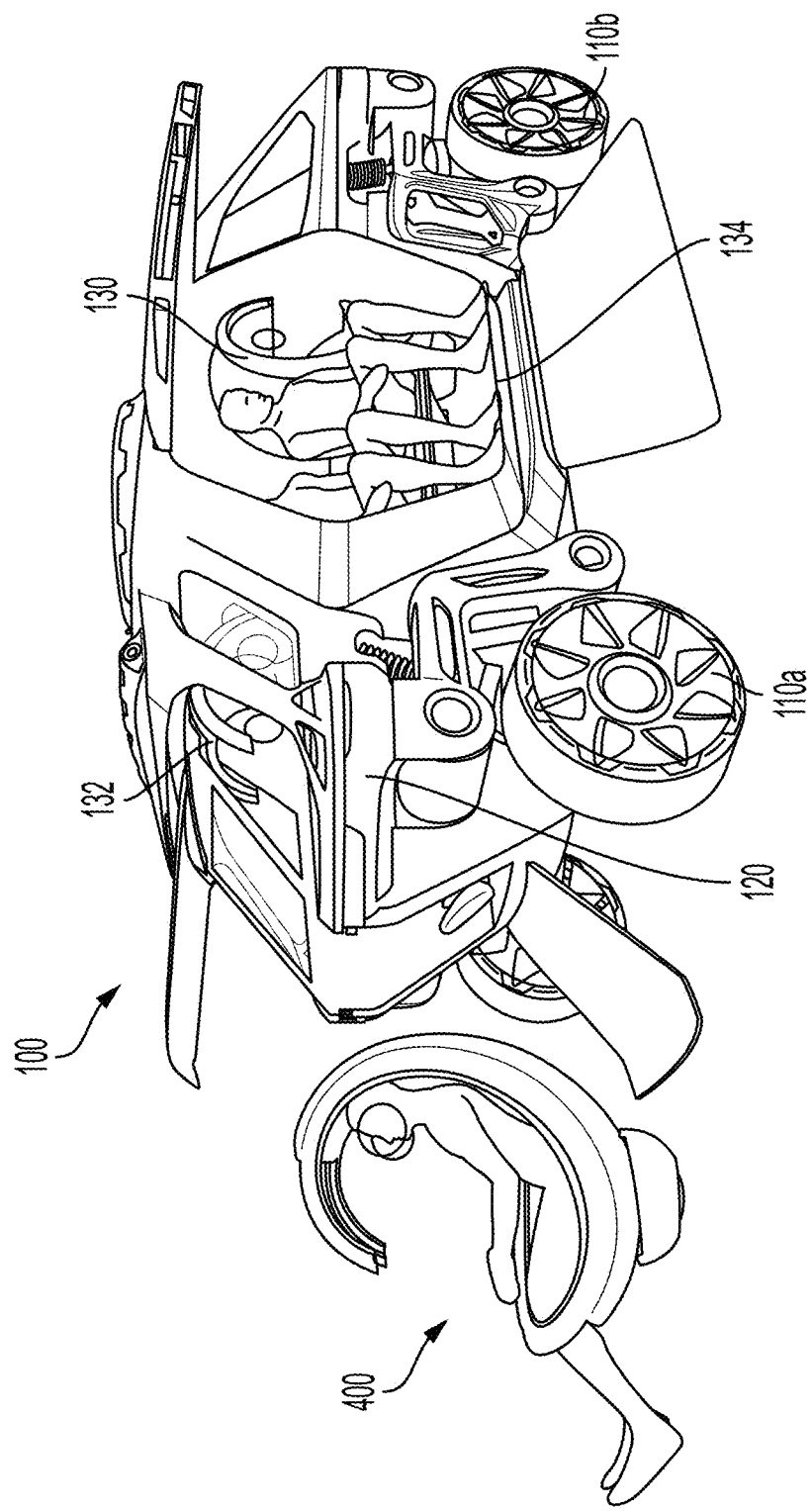
FIG. 4C illustrates a perspective view of a passenger seat exiting a vehicle capable of omnidirectional movement, according to embodiments.

In some embodiments, the passenger seats 400 are removable from the passenger compartment, and possibly capable of self-propelled motion. FIG. 4C illustrates a perspective view of a passenger seat 400 exiting a vehicle 100 capable of omnidirectional movement, according to embodiments. Vehicle 100 include wheel-leg components 110a, 110b, 110c which suitably may mate with a chassis type element 120. Seats 130, 132 and 134 position passengers facing different directions.

In accordance with the described embodiments, wheeled locomotion is available for use in situations where traditional vehicle travel using rolling wheels is available (e.g., roads and highways). Wheeled locomotion is efficient, when available, for conveyance of a vehicle between destinations. In some embodiments, the wheel-leg components allow active height adjustment of the vehicle to go from street use to off-road use.

In walking locomotion, the vehicle is able to walk up elevations and terrain that is not surmountable using wheeled locomotion. In some instances, walking locomotion allows for nimble and quiet motion, relative to wheeled locomotion. The vehicle is also capable of moving laterally, allowing for quadra-pedal ambulation.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A vehicle cabin configured to support omnidirectional travel of a vehicle, the vehicle cabin comprising:
   a pilot section comprising a pilot support feature for securing a pilot of the vehicle; and
   a passenger section comprising a passenger support feature for securing a passenger to the vehicle,
   wherein the pilot support feature is configured to face a different direction than the passenger support feature, and wherein the pilot support feature is configured to rotate with respect to a direction in which the vehicle travels.

2. The vehicle cabin of claim 1, wherein the passenger support feature includes a first seating area and a second seating area, the first seating area facing a different direction than the second seating area.

3. The vehicle cabin of claim 1, wherein the pilot support feature includes a seat with a steering interface.

4. The vehicle cabin of claim 1, wherein the pilot section is located in a center portion of the vehicle cabin.

5. The vehicle cabin of claim 1, wherein the passenger support feature is configured to rotate with respect to a direction in which the vehicle travels.

6. The vehicle cabin of claim 1, wherein the passenger support feature is situated in front of a vehicle window.

7. The vehicle cabin of claim 1, wherein the pilot support feature and the passenger support feature are oriented in a direction facing outside the vehicle cabin.

8. The vehicle cabin of claim 1, wherein the pilot support feature and the passenger support feature are configured to be removed from the vehicle.

9. A vehicle that comprises a vehicle cabin of claim 1.

10. The vehicle of claim 9 whereon the vehicle further comprises: a plurality of wheel-leg components coupled to the vehicle, wherein the plurality of wheel-leg components can provide wheeled locomotion and walking locomotion.

11. A vehicle cabin configured to support omnidirectional travel of a vehicle, the vehicle cabin comprising:
    a pilot section comprising a pilot support feature for securing a pilot of the vehicle; and
    a passenger section comprising a passenger support feature for securing a passenger to the vehicle,
    wherein the pilot support feature is configured to face a different direction than the passenger support feature, and
    wherein the pilot section is located in a center portion of the vehicle cabin.

12. The vehicle cabin of claim 11, wherein the passenger support feature includes a first seating area and a second seating area, the first seating area facing a different direction than the second seating area.

13. The vehicle cabin of claim 11, wherein the pilot support feature includes a seat with a steering interface.

14. The vehicle cabin of claim 11, wherein the passenger support feature is configured to rotate with respect to a direction in which the vehicle travels.

15. The vehicle cabin of claim 11, wherein the passenger support feature is situated in front of a vehicle window.

16. The vehicle cabin of claim 11, wherein the pilot support feature and the passenger support feature are oriented in a direction facing outside the vehicle cabin.

17. The vehicle cabin of claim 11, wherein the pilot support feature and the passenger support feature are configured to be removed from the vehicle.

18. The vehicle cabin of claim 11, further comprising:
    a plurality of wheel-leg components coupled to the vehicle, wherein the plurality of wheel-leg components can provide wheeled locomotion and walking locomotion.

19. A vehicle cabin configured to support omnidirectional travel of a vehicle, the vehicle cabin comprising:
    a pilot section comprising a pilot support feature for securing a pilot of the vehicle; and
    a passenger section comprising a passenger support feature for securing a passenger to the vehicle,
    wherein the pilot support feature is configured to face a different direction than the passenger support feature, and
    wherein the passenger support feature is configured to rotate with respect to a direction in which the vehicle travels.

20. The vehicle cabin of claim 19, further comprising:
    a plurality of wheel-leg components coupled to the vehicle, wherein the plurality of wheel-leg components can provide wheeled locomotion and walking locomotion.

* * * * *